United States Patent
Browning

[15] 3,671,742
[45] June 20, 1972

[54] FILM TRANSFER MECHANISM FOR ELECTRON MICROSCOPES

[72] Inventor: George William Browning, Gt. Chesterford, England

[73] Assignee: Associated Electrical Industries Limited, London, England

[22] Filed: April 28, 1970

[21] Appl. No.: 32,750

[30] Foreign Application Priority Data

June 17, 1969 Great Britain..................30,657/69

[52] U.S. Cl............................................250/49.5 E, 250/66
[51] Int. Cl. ..................................H01j 37/36, G01n 23/00
[58] Field of Search ..........................250/49.5 A, 49.5 E, 66

[56] References Cited

UNITED STATES PATENTS 3,529,154 9/1970 Bouwmeester......................250/49.5
2,483,872 10/1949 Bensen................................250/49.5

OTHER PUBLICATIONS

The Electron Microscope by M. E. Haine, published by E. & F. N. Spon Limited, London, 1961, pp. 210 & 211.

"An Experimental Electron Microscope for 400 Kilovolts" by A. C. Van Dorsten et al., from Philips Technical Review, Vol. 9, No. 7, 1947, pp. 193–201.

*Primary Examiner*—William F. Lindquist
*Attorney*—Watts, Hoffman, Fisher & Heinke

[57] ABSTRACT

An electron microscope comprising a microscope chamber having a passageway extending therethrough and a film mechanism for driving an electron stimulated means, or film plate, into the microscope chamber. The film mechanism includes a tray disposed within the microscope chamber and communicating with the passageway, a closure member positioned across the passageway for preventing the passage of X-rays through the passageway, a storage chamber disposed externally of the microscope for storing a film plate, and transport means for driving a film plate from the storage chamber to the tray so that the film plate is moved to a position to intercept a beam of electrons passing through an object to be viewed.

15 Claims, 13 Drawing Figures

Patented June 20, 1972

INVENTOR.
GEORGE W. BROWNING
BY
Watts, Hoffmann, Fisher & Heinke
ATTORNEYS

Patented June 20, 1972  3,671,742

INVENTOR.
GEORGE. W. BROWNING
BY
Watts, Hoffmann, Fisher, & Heinke
ATTORNEYS

Patented June 20, 1972

INVENTOR.
GEORGE W. BROWNING
BY
Watts, Hoffmann, Fisher & Heinke
ATTORNEYS

Patented June 20, 1972

INVENTOR.
GEORGE W. BROWNING
BY
Watts Hoffmann, Fisher & Heinke.
ATTORNEYS

INVENTOR.
GEORGE W. BROWNING

BY
Watts, Hoffmann, Fisher & Heinke
ATTORNEYS

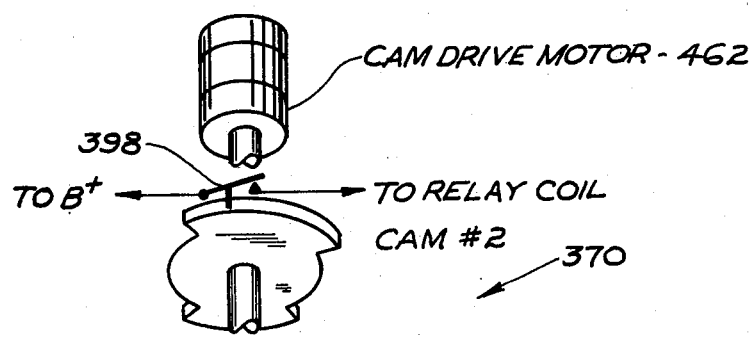
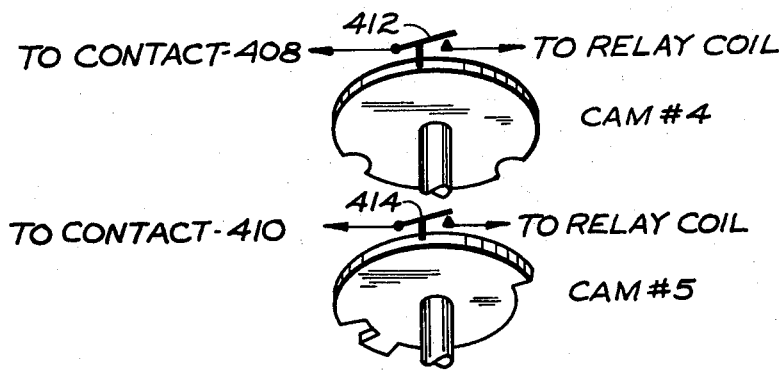
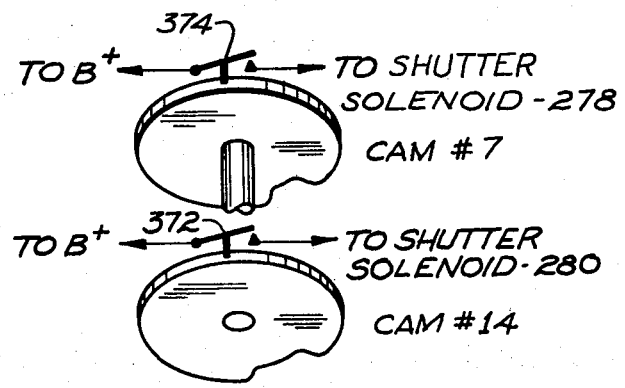
Fig. 12
INVENTOR.
GEORGE W. BROWNING 3,671,742

FILM TRANSFER MECHANISM FOR ELECTRON MICROSCOPES

BACKGROUND OF THE INVENTION

This invention pertains to the art of electron microscopes, and more particularly, to an improved film mechanism for electron microscopes for storing a plurality of film plates and sequentially moving the film plates into the microscope chamber.

Electron microscopes have included a camera, having a plurality of film plates, which is mounted directly beneath the viewing chamber and positioned in line with the beam of electrons which pass through a specimen or object to be viewed. These cameras perform relatively satisfactorily with conventional electron microscopes; however, when electrons are accelerated to a high velocity, the penetrating rays will fog or cloud the photographic plates which are placed in close proximity to the beam of electrons.

Another problem associated with known cameras for electron microscopes is that water vapor which is emitted from the photographic film when a vacuum is applied to the film, frequently permeates the entire microscope chamber and is detrimental to the operation of the microscope For example, this water vapor can cause stripping of the specimen.

A still further problem associated with known cameras for electron microscopes is that it is not possible to load exposed film into the camera and unload exposed film from the camera without a loss in the vacuum within the microscope chamber.

SUMMARY OF THE INVENTION

The present invention is directed toward electron microscopes having a camera mechanism in which the film plates are stored externally of the microscope chamber, thereby overcoming the noted disadvantages, and others, of such previous electron microscopes.

In accordance with one aspect of the present invention, the electron microscope includes a microscope chamber having a passageway extending therethrough and having a source of electrons positioned within the chamber, focusing means for directing the electrons into a beam of electrons, means for directing the electrons toward an object to be irradiated, object positioning means for positioning an object in the beam of electrons, and a film mechanism for driving an electron stimulated means, or film plate, into the microscope chamber. The film mechanism includes tray means disposed within the microscope chamber and communicating with the passageway, closure means positioned across the passageway for normally substantially preventing the passage of X-rays through the passageway, storage chamber means disposed externally of the microscope chamber for storing the film plate, and, transport means for driving the film plate from the storage chamber to the tray means so that the film plates may be moved into a position to intercept the beam of electrons which pass through the object.

In accordance with another aspect of the present invention, the film mechanism includes a second tray means disposed in the storage chamber for supporting a film plate and positioned to communicate with the passageway so that a film plate may be moved along the second tray means, through the passageway, and onto the first tray means within the microscope chamber.

In accordance with still another aspect of the present invention the film mechanism includes motor means coupled to the transport means in a manner so that when the motor means is energized the transport means drives a film plate along the first tray means and into the microscope chamber.

In accordance with a further aspect of the present invention, the film mechanism includes passage means communicating with the storage chamber means for evacuating the storage chamber means independently of the electron microscope chamber.

In accordance with still another aspect of the present invention, a shutter mechanism is positioned between the film mechanism and the specimen or object so that the beam of electrons passing through the object may be transmitted to a film plate in the film mechanism for a predetermined period of time.

In accordance with yet another object of the present invention, there is provided a method of sequentially positioning a plurality of film plates into an electron microscope. The electron microscope includes a microscope chamber with a passageway extending therethrough, storage chamber means positioned externally of the microscope chamber, tray means positioned within the microscope chamber for supporting a film plate within the microscope chamber, and drive means for moving a film plate. The method includes the steps of energizing the drive means for moving a film plate from the storage chamber, through the passageway, and onto the tray means within the microscope chamber, and electrically energizing the drive means to move the film plate along the tray means, through the passageway, and back into the storage chamber.

The primary object of the present invention is to provide an electron microscope having a film mechanism in which the film is stored externally of the microscope chamber.

Another object of the present invention is to provide an electron microscope in which the film storage chamber may be evacuated independently of the microscope chamber.

Another object of the present invention is to provide an electron microscope having a film mechanism which may be loaded with unexposed film and/or unloaded of exposed film without a loss in vacuum within the microscope chamber.

A further object of the present invention is to provide an electron microscope having a film mechanism in which a plurality of film plates may be sequentially transported into the microscope chamber and sequentially removed after the exposure of each plate.

BRIEF DESCRIPTION OF THE DRAWINGS

These and other objects and advantages of the invention will become apparent from the following description of a preferred embodiment of the invention as read in connection with the accompanying drawings in which.

DESCRIPTION OF THE PREFERRED EMBODIMENT

Figure 1:
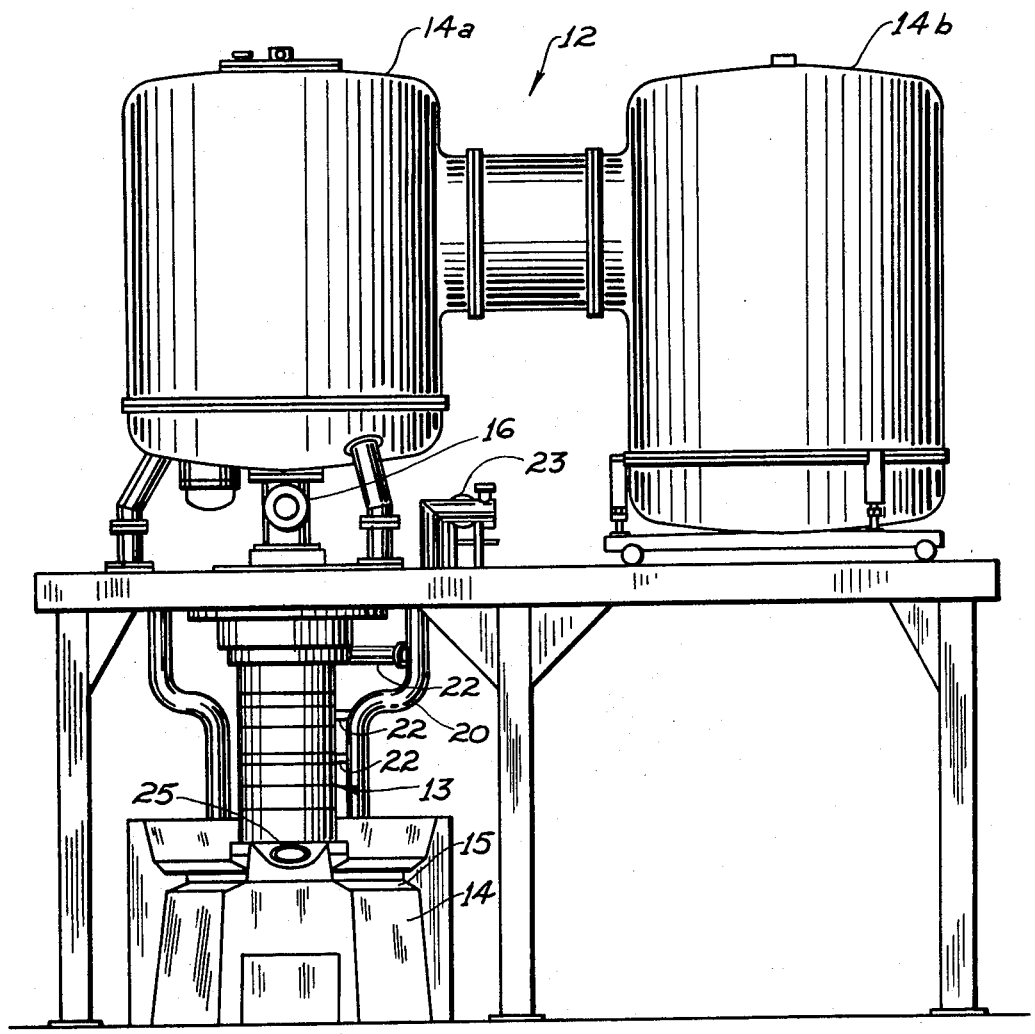
FIG. 1 is an elevational view of a high voltage electron microscope of the present invention.
Figure 2:
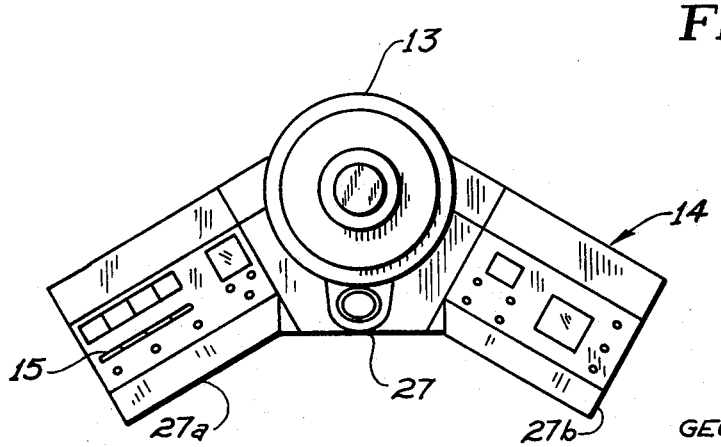
FIG. 2 is a top plan view of the microscope column.

Referring now to the drawings, FIGS. 1 and 2 illustrate one orientation of the components of a high voltage electron microscope system 10. The microscope 10 has a high voltage electron source 12 positioned above a microscope column 13 and a control console 14. The electron source 12 includes a pair of pressurized tanks 14a, 14b containing respectively a high voltage electron accelerator and a high voltage generator which are coupled to an intermediate section 16 positioned above the microscope column 13. The column includes a housing assembly 18 composed of a stack of tubular members which define an analytical chamber within the column.

The electron source 12 generates a very high potential, i.e., one million volts. This potential, when applied to the electron gun at the head of the accelerator and contained within it but not shown, causes electrons to be propelled through the analytical chamber within the microscope column 13 with very high energy.

A vacuum manifold 20 having a plurality of cylinders 22 is coupled to the column 13. The manifold 20 is also coupled to a vacuum pump 23 so that the entire chamber within the microscope column 13 may be evacuated.

In the arrangements of FIGS. 1 and 2 the control console 14 is positioned in juxtaposition to the column 13. The console includes a panel 15, and is positioned with respect to the microscope so that an operator may readily observe an image of the specimen through a viewing window 25.

FIG. 2 illustrates in more detail the construction of the control console 14 and its orientation with respect to the column which includes a center console section 27 and a pair of wing console sections 27a, 27b. The console sections, 27a, 27b are positioned in juxtaposition to the column 13, and angle forwardly with respect to the center section. Thus, rather than being aligned, each console wing section is at an angle of about 25° with the center section. This facilitates operator control and also maximizes access to the microscope column 13 for service, adjustments, insertion of specimens, and the like. In addition, for access to substantially the entire column 13, the wing consoles 27a, 27b may be readily removed.

Figure 3:
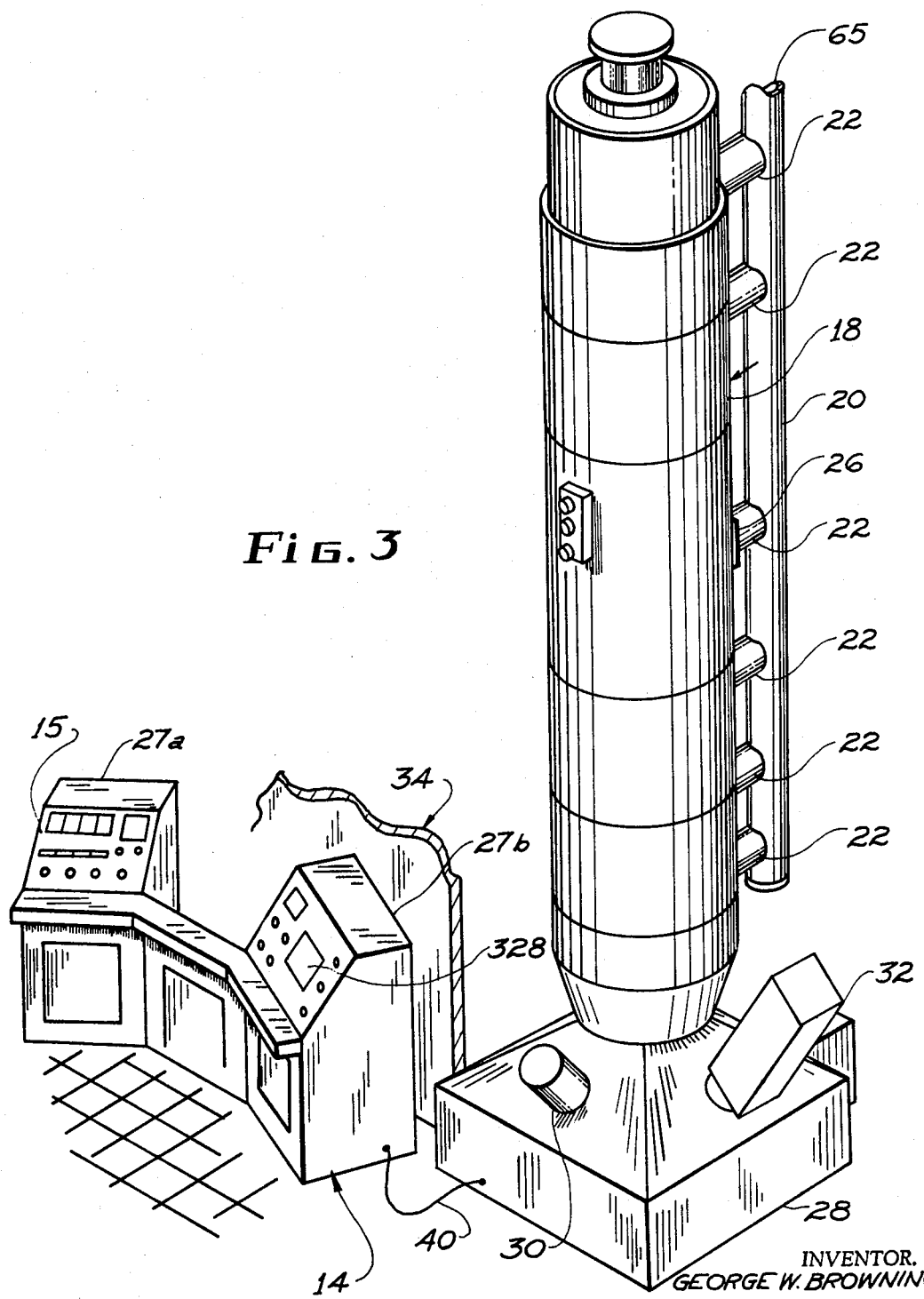
FIG. 3 is a perspective view illustrating in more detail the microscope column including a film mechanism of the present invention.

FIG. 3 illustrates another arrangement of the components of the electron microscope system 10. The control console 14 is positioned in spaced relationship with respect to the microscope column 13. A protective screen 34 is disposed between the electron microscope column 13 and the control console 14 for intercepting penetrating X-rays and gamma rays, in order to protect the operating personnel. The screen 34 takes the form of a wall of material which will absorb X-rays generated by the microscope during studies.

The column 13 includes a viewing chamber assembly 28. The viewing assembly supports the housing assembly 18. The viewing assembly has a viewing window 30 through which an operator may view a specimen image. For remote viewing of a specimen image, the viewing assembly also includes a television camera 32 positioned to view an image of the specimen.

Figure 4:
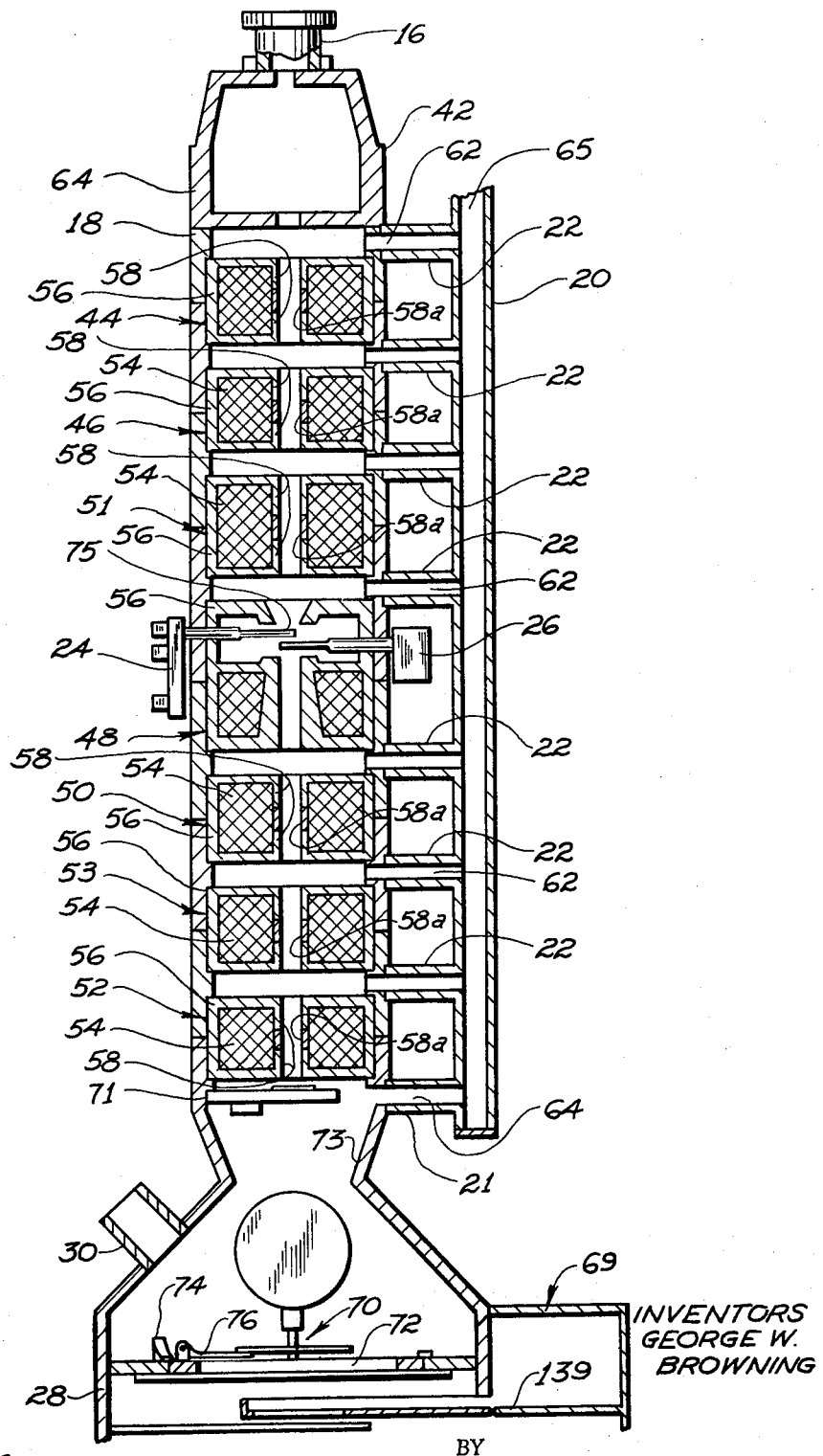
FIG. 4 is a section view illustrating in more detail the microscope column.

FIG. 4 illustrates in more detail the construction of the microscope column 13. The upper one of the tubular members defines a bore 42 extending therethrough. The electron accelerator and generator 16 is positioned on top of the housing assembly in communication with the bore 42.

A pair of condenser lenses 44, 46; a set of deflector coils 51; an objective lens 48; and three projector lenses 50, 52, 53 are respectively positioned within the housing assembly 18. Each of the lenses 44, 46, 48, 50, 52 and 53 generally includes a magnetic winding 54, supported by a frame member 56 constituting the magnetic circuit. Each winding 54 is positioned around two pole pieces 58. The pole pieces define a lens gap 58a for directing and focusing a flow of electrons through the microscope.

A specimen positioning control assembly 24 is mounted on one side of housing assembly 18. Another specimen positioning control assembly is provided 90° from the assembly 24, but not shown. The specimen assemblies are identical with one controlling X and the other Y adjustment of a specimen. An aperture positioning assembly 26 is mounted on the same tubular member of the assembly 18, directly below the specimen control assembly 24 shown diametrically opposite the specimen assembly 24 for convenience.

Communication between the analytical chamber within the housing assembly 18 and the vacuum manifold 20 is provided through a plurality of manifold connections 22 and a plurality of passages 62 extending through the housing members. The viewing chamber is connected to the manifold by a manifold connection 21 and a passage 64 through the wall of the viewing chamber assembly 28. Thus, the entire column 10 may be evacuated by applying a vacuum at the inlet 65 of the manifold 20.

A screen mechanism 70 is positioned within viewing chamber assembly 28 for viewing an image of a specimen under investigation. Screen mechanism 70 is positioned near the base of the viewing chamber assembly. The screen mechanism includes a rotatable table 72. A cam 74 is mounted on the table 72 for driving a viewing plate support arm 76 to either a vertical position, an intermediate position, or a horizontal position.

A shutter mechanism 71 is mounted at the base of the housing assembly 18 immediately above an upper section 73 of the viewing chamber assembly 28. The shutter mechanism is positioned beneath projector lens 52.

The shutter mechanism upon being opened, allows the passage of a beam of electrons generated by the electron source 12. The electron beam is focused by the condenser lenses 44, 46 onto the specimen 75. The electron beam leaving the object 75 contains an image which is magnified by lenses 50, 52 and 53 and is then projected onto the screen or film in the viewing chamber 28 which the shutter is open. Upon closure of shutter mechanism 71, the beam of electrons is interrupted and prevented from passing into viewing chamber 28.

A film mechanism 69 is mounted on the viewing chamber assembly 28 and shown as mounted to the rear thereof and extending into the viewing chamber. The film mechanism 69 includes structure to move a film plate into a position beneath the screen mechanism 70 for viewing by the beam of electrons.

FIGS. 5 through 8 illustrate in more detail the film mechanism 69. The film mechanism includes a film housing 131 mounted on the wall of viewing chamber 28 and a film tray 133 extending into the centerl bore. More particularly, the housing 131 includes a first storage chamber 135 for storing unexposed photographic plates, a second storage chamber 137 for storing exposed photographic plates, and a partition member 139 for separating the storage chambers 135, 137.

A passage 141 extends through a side wall 141a of the viewing chamber assembly 28. The film tray 133 is aligned with the passage 141 and is mounted on the wall 141a. The tray extends in a plane generally perpendicular to the direction of the electron beam. A window 143 is positioned across the outside opening of the passage 141 and is mounted on a shaft 145 for rotation to either the position shown in solid lines in FIG. 6 or to the position shown in phantom in which the window 143 is in a horizontal position. An O-ring seal 145a is positioned between the window and the wall of housing 131 to provide a vacuum seal when the window is in a closed position. The drive arrangement between window 143 and a drive motor 157, and more specific details as to the construction of window 143, are set forth in the reference U.S. Pat. application, Ser. No. 689,642 entitled "Radiation Analyzers."

The shaft 145 is coupled through gears 155a and 155 to a gear 153, which in turn drives another gear 159. The gear 159 is coupled to a shaft 163 for driving a bridge member 165.

Figure 6:
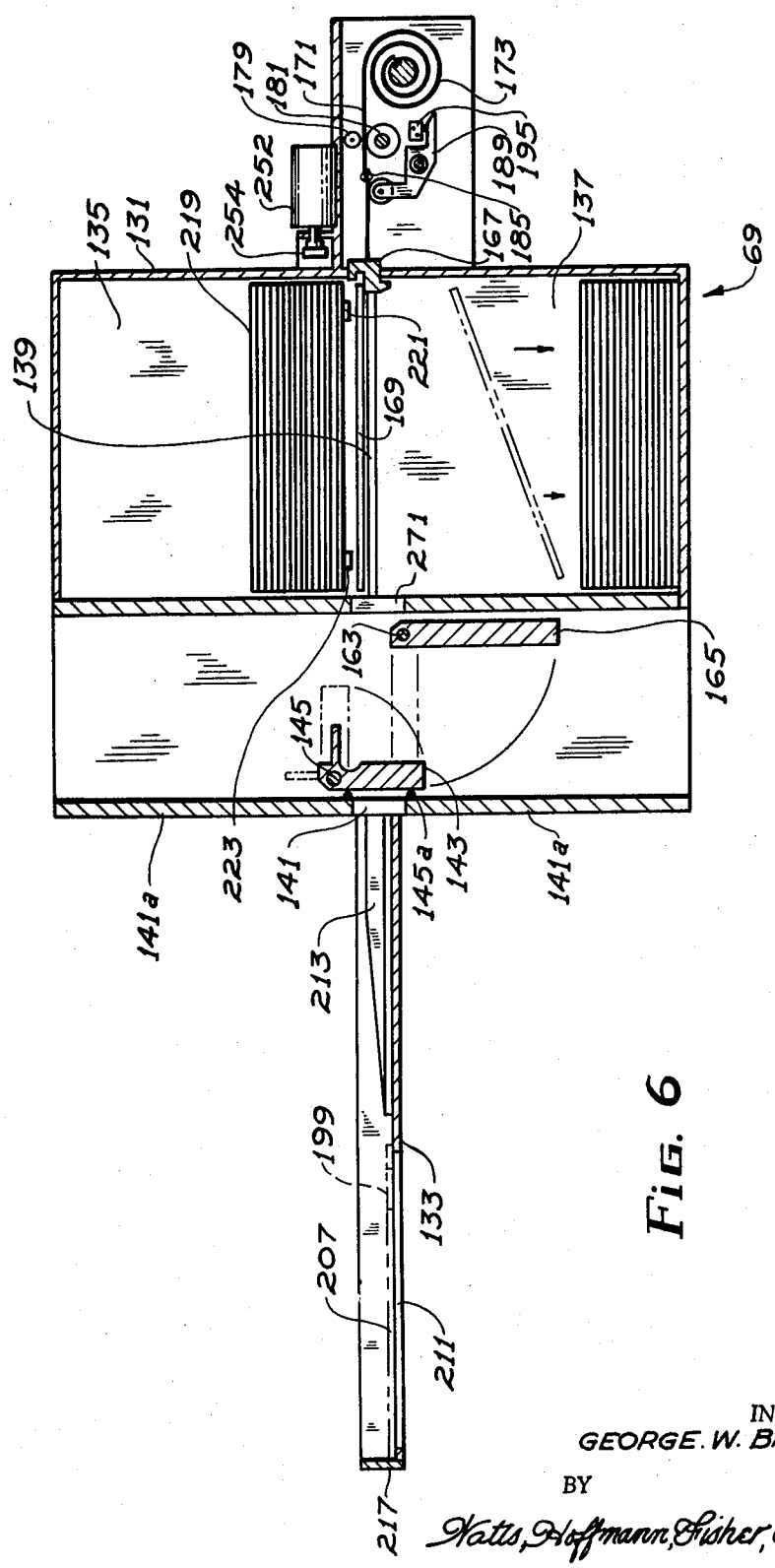
FIG. 6 is a sectional view of the film mechanism of FIG. 5 taken along lines 6—6.

The bridge member 165 is mounted on the shaft 163 which is journaled for rotation by a pair of bushing blocks 163a, 165a. Thus, when shaft 145 of the window 143 is rotated in one direction, the bridge member 165 will be rotated in a clockwise direction, as seen in FIG. 6, thereby raising the bridge member to the position shown in phantom. When the shaft 145 rotates in a counterclockwise direction, the bridge member 165 is rotated in a counterclockwise direction thereby returning the bridge member 165 to the solid line position.

A generally U-shaped member 167 is supported by the partition 139 for driving a film plate 169 from the unexposed film housing 131 to the film tray 133. More particularly, U-shaped member 167 is connected to a metallic tape 171 which is wound around a drum member 173. The metallic tape 171 preferably comprises a steel tape which is curved laterally to enhance its rigidity.

A first drive roller 179 is positioned below the tape 171 and a second drive roller 181 is positioned below the tape 171 to prevent the tape from bending or collapsing when the U-shaped member 167 is moved to the left and to assit in driving the tape. The rollers 179, 181 are coupled through a gear arrangement to a film drive motor 177 so that when the motor is rotated in a first direction, the tape 171 is reeled off of the drum member 173 and when the motor 175 is rotated in the other, the tape 171 is wound onto the drum member 173.

Figure 7:
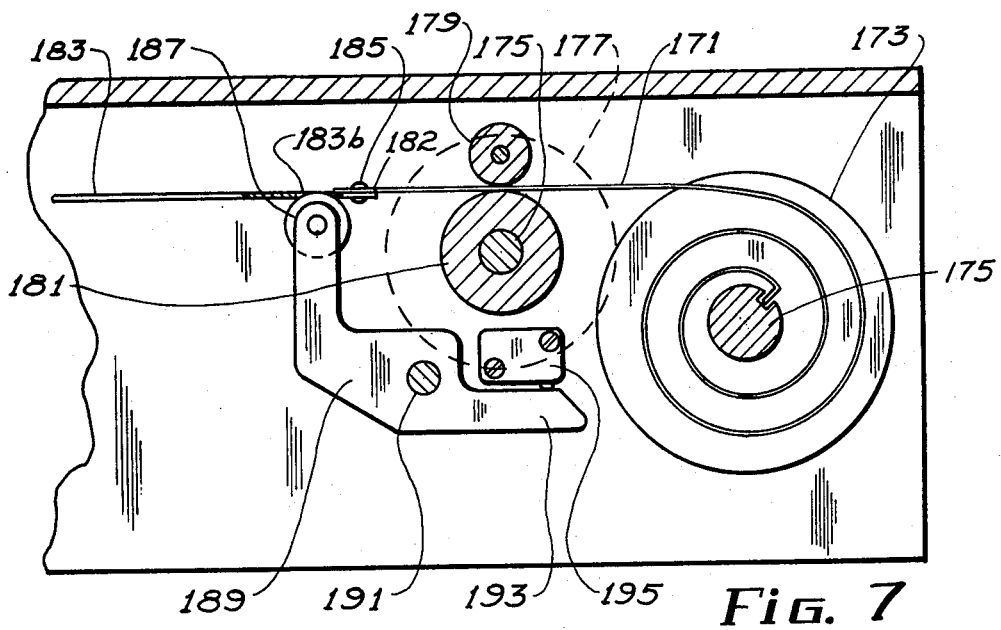
FIGS. 7, 7a and 8 are sectional views illustrating in still more detail certain portions of the film mechanism as shown in FIGS. 5 and 6.
Figure 8:
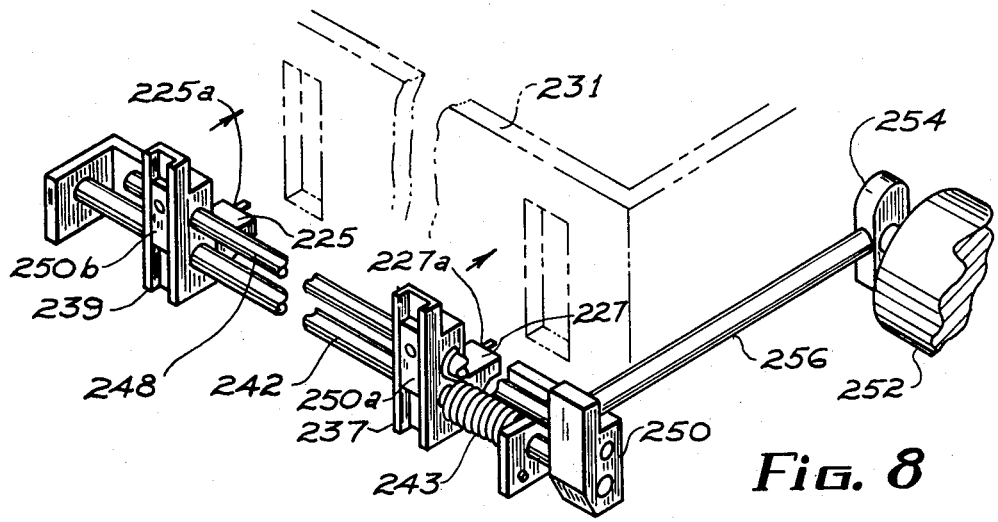

As illustrated in FIG. 7, the tape 171 is spliced at 182 to a relatively stiff tape end portion by a rivet 185. A roller 187 rides on the bottom portion of the tape 183 and is pivotally mounted on a bell crank 189. The bell crank 189 is pivotally mounted on a shaft 191 and includes an arm portion 193 which abuts a limit switch 195. Thus, when the U-shaped member 167 is withdrawn to the right, as seen in FIGS. 6 and 7, the roller 187 rises and extends into a slot 183b. The rising of the roller 187 permits bell crank arm part 193 to release the normally depressed actuator portion of the limit switch 195. The limit switch 195, being coupled to the drive motor 177, de-energizes the motor 177 when the U-shaped member is fully retracted.

Figure 7A:
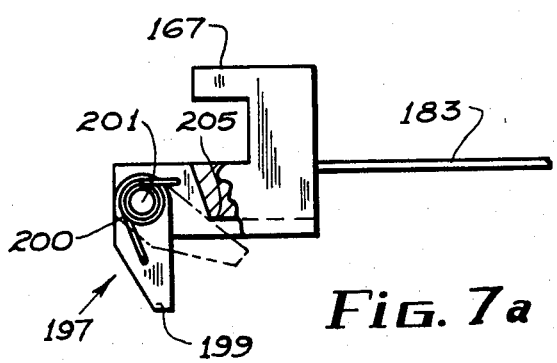

As illustrated in FIG. 7a, the U-shaped member 167 also includes a latching arrangement 197. The latching arrangement 197 comprises a latch 199 which is pivotally mounted on a shaft 201. A spring 200 normally biases the latch in a clockwise direction, as viewed in FIG. 7a, until it is in the solid-line position and it abuts against a stop, not shown.

The film tray 133 is of a rectangular configuration and includes a pair of side walls 207, 209. The tray defines an opening 211 extending through the bottom portion to permit uninterrupted passage of the electron beam to another imaging device, not shown, which may be positioned beneath the film tray 133.

The tray has a pair of flanged portions 213, 215 extending inwardly from the side walls 207, 209, respectively for guiding a film plate and then supporting it in an exposure position across the opening 211. An end wall 217 extends across the end of walls 207, 209 to limit the film plate travel to the left as viewed in FIG. 6.

The unexposed film plates 219 are retained at a position above the partition member 139 by four bell cranks 233, 235, 237, 239 having lower projections 221, 223, 225, 227 extending therefrom, respectively, for retaining the bottom film plate. The bell cranks 233, 235, 237, 239 also contain projecting pins 221a, 223a, 225a, 227a extending therefrom for engaging the film plate next to the bottom film plate to prevent all of the plates from falling when a single plate is released. The projections extend through the side walls 229, 231 of the first storage chamber 135. The bell cranks 233, 235 pivotally mounted on a shaft, not shown, but corresponding to a shaft 242 on which the bell cranks 237, 239 are pivotally mounted. A shaft 244 extends pivotally through the bell cranks 233, 235, and supports levers 246a and 246b. A lever 246 attached to the end of the shaft 244 extends at a right angle with respect to the shaft. Similarly, a shaft 248 extends pivotally through the bell cranks 237, 239 and supports levers 250a and 250b. A lever 250 extends from the end of the shaft 248 at a right angle with respect to it.

A drive motor 252 is coupled through a cam drive arrangement 254 to a pair of push rods 256, 258. Thus, as the drive motor 252 drives the cam 254 through 180° rotation, the rods 256, 258 move inwardly from the cam drive arrangement 254 allowing the levers 246, 250 to move inwardly under the action of a spring 243. As the levers 246, 250 move inwardly, the lower projections 221, 223, 225, 227 move outward, and the projecting pins 221a, 223a, 225a, and 227a retract thereby releasing the lowermost film plate 219 so that it falls upon partition member 139. The projecting pins 221a, 223a, 225a, 227a then re-project and are lifted as levers 221, 223, 225, and 227 move inwards again, retain the remaining film plates when the bottom plate is released.

When the film plate is positioned on partition 139, the bridge 165 is elevated and the window 143 is opened. The drive motor 177 is then actuated to move U-shaped member 167 to the left, as viewed in FIGS. 5 and 6, to drive the film plate 169 across the bridge, through passage 141, and onto the tray 133. As the film plate moves to the left, it travels along the flanges 213, 215 until it moves into the exposure position across the opening 211 as shown in FIG. 16. The U-shaped member 167 is then withdrawn to a position as shown in FIG. 6 and the bridge and window are returned to the positions shown in solid line.

Figure 5:
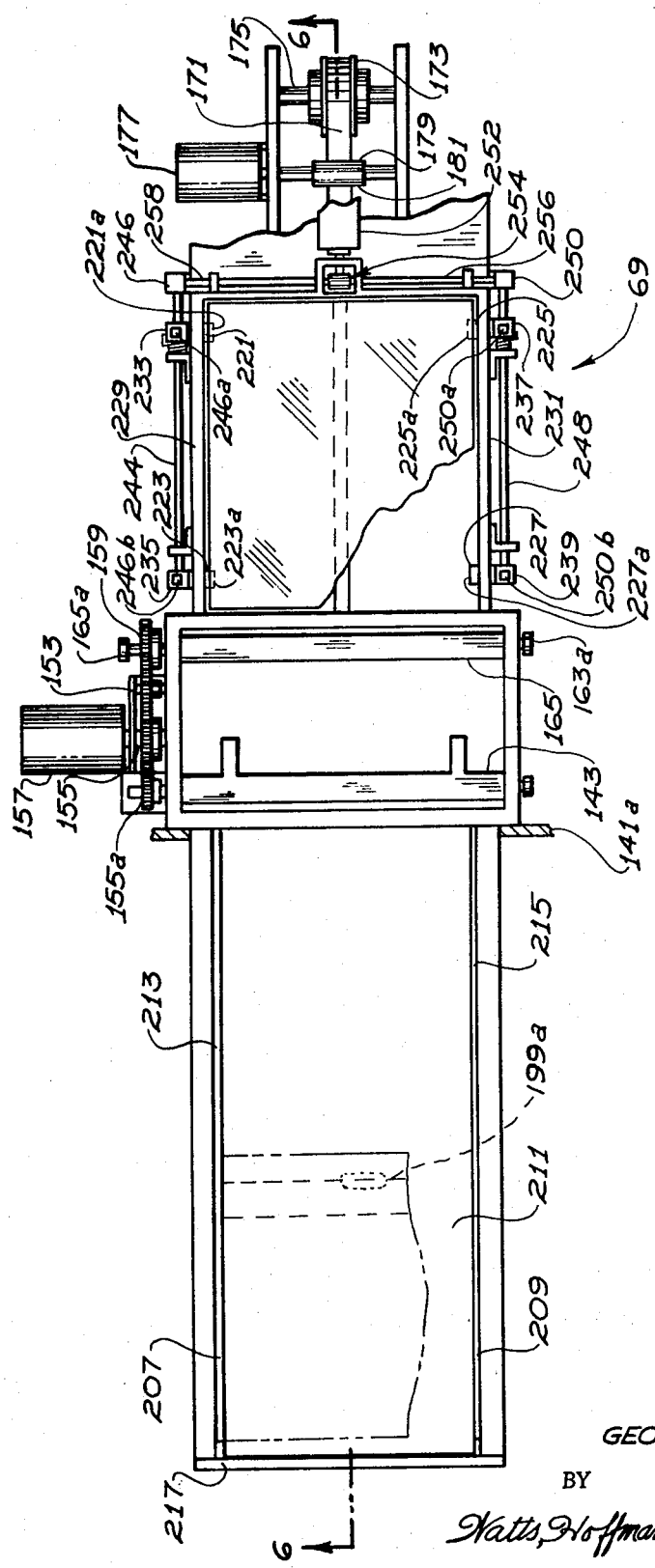
FIG. 5 is a top view illustrating in more detail a film mechanism shown in FIG. 4.

The film plate 169 is then exposed by a beam of electrons. After exposure of the plate 169, the U-shaped member 167 is again moved to the left, the bridge 165 is moved to the horizontal position, the window 143 is again opened, and u-shaped member 167 is moved to the exposed film plate. As the travel of the tape continues to the left, the latch 199 engages the film plate and is moved counterclockwise to the phantom position of FIG. 6. The latch then rides over the edge of the film tray and snaps back to its solid-line position as it drops into a slot 199a in the right-hand side, as seen in FIG. 5, of the film plate. The U-shaped member 167 is withdrawn, allowing the film plate 169 to pass beneath the flanges 213, 215 and through passage 141.

As the photographic plate is returned across bridge 165, it is drawn through passage 271, drops under the partition 139, and then into exposed film storage chamber 137. Finally, the bridge 165 and window are returned to the solid-line positions, illustrated in FIG. 6, and the U-shaped member 167 is returned to the position as illustrated in FIG. 6, thereby setting up the film mechanism for transporting the next film plate or for allowing operation of the microscope in a viewing mode.

Figure 9:
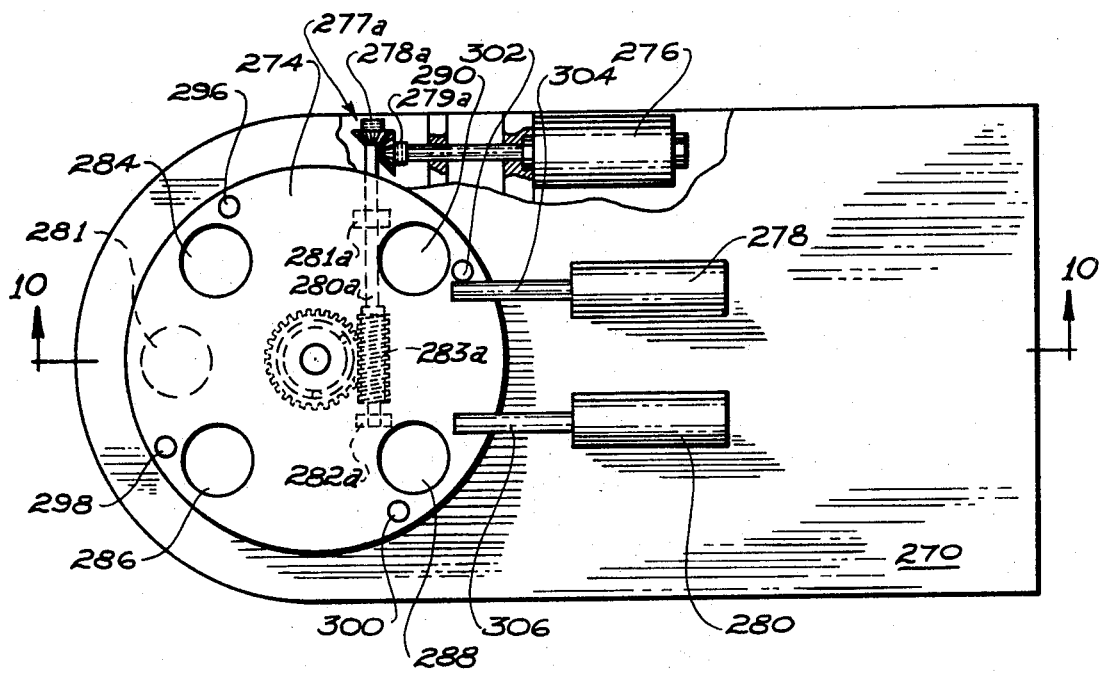
FIG. 9 is a top view illustrating in more detail a shutter mechanism as shown in FIG. 4.
Figure 10:
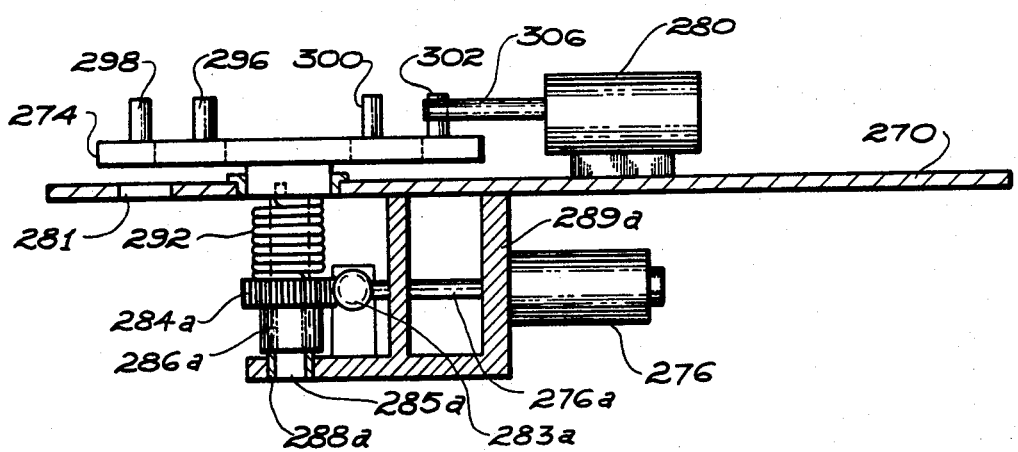
FIG. 10 is a sectional view of the shutter mechanism of FIG. 9 taken along lines 10—10; and, FIGS. 11 and 12 are block diagrams and electrical schematic diagrams illustrating the control circuitry for the electron microscope as shown in FIG. 3.

FIGS. 9 and 10 illustrate in more detail the shutter mechanism 71 which generally comprises a support plate 170 which extends in a plane perpendicular to the direction of the electron beam, a shutter disc 274 mounted on the plate 270 for rotation in a plane parallel to the plate, a disc drive mechanism 276, and a pair of solenoid devices 278, 280 for controlling the position of the shutter disc 274. More particularly, an aperture 280 extends through the plate 270 and the shutter disc 274 has four openings 284, 286, 288, 290 extending therethrough in a manner so that when disc 274 is rotated the apertures 284, 286, 288, 290 pass over the aperture 280.

The shutter disc 274 is spring driven by a spring drive 292, which in turn is rewound by a spring drive motor 276. The drive motor 276 is coupled through a shaft 276a and through a differential gear arrangement 277a, including a pair of gears 278a, 279a, to a shaft 280a. The shaft 280a is supported by a pair of bushings 281a and 282a, and drives a worm gear 283a. The worm gear 283a engages a gear 284a which is mounted for rotation on a shaft 285a with a bushing 286a. Thus, upon energizationof motor 276, the gear 284a is rotated to wind or rewind spring 292. A rachet mechanism (not shown) prevents spring 292 from unwinding when the motor 276 is deenergized.

The shutter disc 274 is mounted on the shaft 285a and extends through a bushing 287a which is mounted on the plate 270. Also, shaft 285a is retained by another bushing 288a which is in turn mounted in an L-shaped bracket 289a. Accordingly, once the spring 292 is wound by motor 276, disc 274 is biased to rotate in a clockwise direction as viewed in FIG. 18.

Extending upwardly from the shutter discs 274 are four pins 296, 298, 300, 302 which are spaced along the outer edge of disc 274. The solenoid positioning devices 278, 280 each respectively include a shaft 304, 306, positioned to intercept the pins 296, 298, 300, 302 as the disc is rotated. Thus, when solenoid 278 is actuated, thereby moving shaft 304 to the right, aperture 286 of disc 274 is moved over aperture 282 in the plate 270. This position provides an opening in the shutter mechanism for the electron beam to pass through. In this position, the pin 302 is moved against shaft 306 of solenoid device 280.

In order to close the passage through aperture 286 and aperture 282, the solenoid 280 is energized, thereby moving the shaft 306 in a direction to the right and allowing pin 296 to move to a position beside the shaft 304 of solenoid 278, which has since been returned to the position illustrated in FIG. 9. Thus, by actuating solenoids 278, 280 at predetermined time intervals, it is possible to open the shutter mechanism for a preselected time duration.

Figure 11:
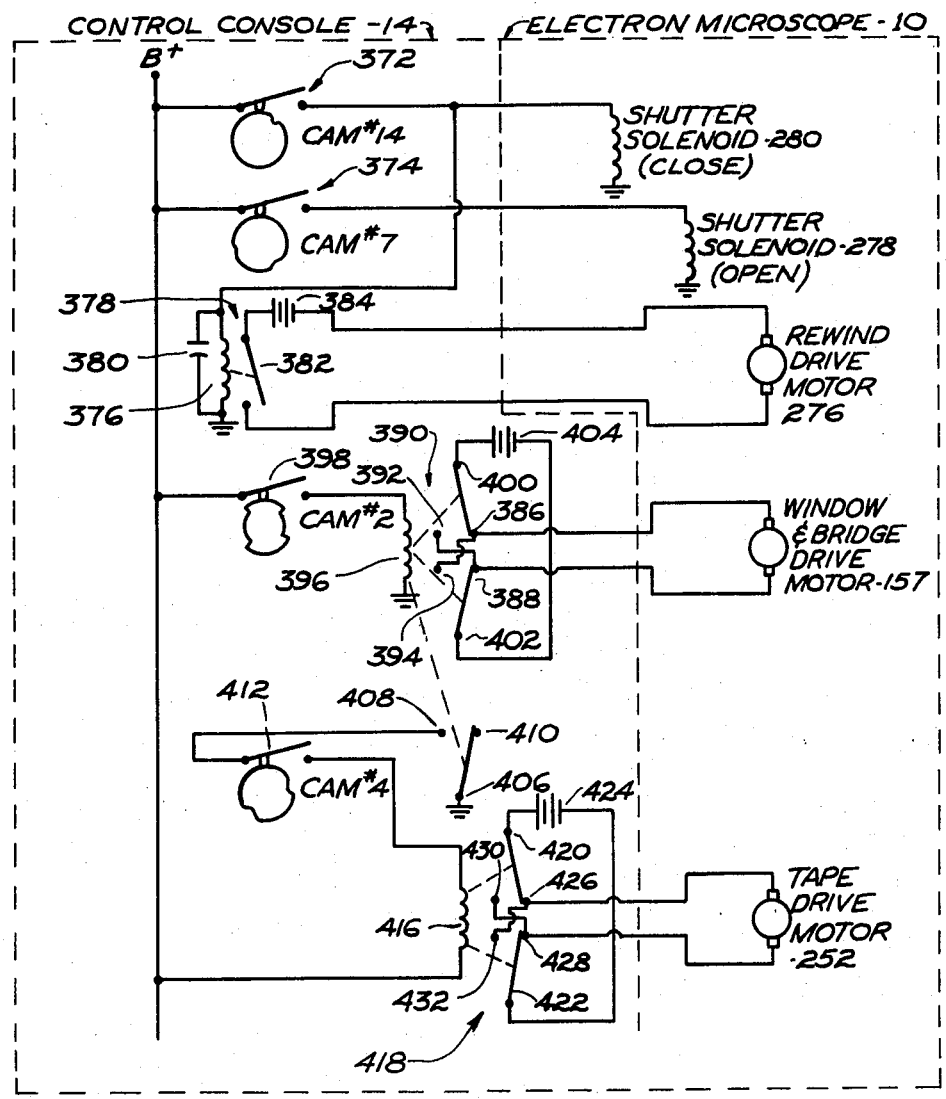

Reference is now made to FIGS. 11 and 12, which illustrate the control circuit for the shutter mechanism 71, the bridge member 164, the window 142, and the tape drive motor 252. More particularly, a cam switching device 370 and its associated circuitry is mounted in the control console 14, and is electrically coupled to various solenoids and drive motors within the electron microscope 10 for controlling various operations within the microscope from the control console 12.

One terminal of the "close" shutter solenoid 280 is coupled through a cam switch 372 to a B+ voltage supply source. Switch 372 rides on cam No. 14 as illustrated in FIG. 12. Similarly, one terminal of the "open" shutter solenoid 278 is coupled through a cam switch 374 to the B+ voltage supply source. The other terminals of both of the solenoids 278, 280 are connected directly to ground. As illustrated in FIG. 12, switch 374 rides on cam No. 7. One terminal of the coil 376 of a normally-open relay 378 is connected to the junction between cam switch 372 and the "close" shutter solenoid 280. The other terminal of coil 376 is connected directly to ground, and capacitor 380 is connected across the terminals of coil 376.

The normally-open contacts 382 of a relay 378 are connected in a series circuit with a voltage supply source 384 and the rewind drive motor 276.

The drive motor 157 controls the operation of window 142 and bridge member 164 and is coupled across a pair of stationary contacts 386, 388 of a triple-pole, double-throw relay 390. The corresponding stationary contacts 392, 394 of relay 390 are coupled to contacts 388, 386, respectively. The coil 396 of a relay 390 is connected in a series circuit between ground and the B+ voltage source through a switch 398. The switch 398 rides on cam No. 2.

The movable contacts 400, 402, corresponding to stationary contacts 386, 392 and 388, 394, respectively, are connected together through a voltage supply source 404. A third movable contact 406 of relay 390 is connected to ground, and the two corresponding stationary contacts 408, 410 of that relay are respectively connected through cam switch 412, to one terminal of the coil 416 of a relay 418. The other terminal of coil 416 is connected to the B+ voltage supply source. Switch 412 rides on cam No. 4, as is illustrated in FIG. 12.

A double-pole, double-throw relay 428 includes a pair of movable contacts 420, 422. These contacts 420, 422 are coupled together through a voltage supply source 424. The tape drive motor 252 is coupled across a corresponding pair of stationary contacts 426, 428 of relay 418, and the remaining contacts 430, 432 of relay 418 are respectively coupled to contacts 428, 426 of that relay.

As illustrated in FIG. 12, the cams Nos. 2, 4, 5, 7, 14 are mounted on a common shaft 460, and shaft 460 is coupled to a cam drive motor 462. Accordingly, when drive motor 462 is energized to rotate shaft 460, a predetermined sequence of operations occur within the electron microscope. More particularly, when the shaft 460 begins to rotate in a counterclockwise direction, cam No. 14 causes switch 372 to close and shutter solenoid 280 to be energized, which in turn causes the shutter mechanism 71 to close, and for a predetermined delay time caused by the charging of capacitor 380, the rewind drive motor 276 is energized to rewind coil 292 of shutter mechanism 71.

As the cams continue to rotate, cam No. 2 causes switch 298 to close thereby causing the window 143 to open, and bridge member 165 to move to a horizontal position. Then, switch 412 is closed by cam No. 4, which in turn causes relay 418 and tape drive motor 252 to be energized. When motor 252 is energized, the tape 171 is reeled out to move a photographic plate along the flanges 213, 215 and to a position across opening 211. Cam No. 4 then causes switch 412 to reopen thereby reversing the direction of tape drive motor 252 and withdrawing tape 171.

As the shaft 460 continues to rotate, cam No. 2 causes switch 378 to close, which will in turn reverse the direction of drive motor 157 causing window 143 to close and bridge 165 to move to a vertical position. Cam No. 7 then causes switch 374 to close, which will in turn energize shutter solenoid 278 to open the shutter mechanism 71. Then, cam No. 14 again causes switch 372 to close thereby energizing shutter solenoid 280 and causing shutter mechanism 71 to close. The rewind operation is again repeated.

As the shaft 460 is rotated still further, cam No. 2 causes switch 398 to reopen thereby causing drive motor 157 to reverse its direction of rotation. With the reversal of motor 157 the window 143 is reopened and bridge 165 again moves to a horizontal position. Cam No. 4 again causes switch 412 to close, which will in turn cause tape 171 to unwind until the U-shaped member 167 is moved to a position on the left portion of the exposed film plate position across opening 211. The latch 199 engages the slot 199a of the exposed film plate and tape 171 is withdrawn upon re-opening of switch 412 by cam No. 4. The withdrawal of tape 171 causes the exposed photographic plate to be inserted through passage 271 and into the exposed plate storage chamber 136.

Finally, the shutter mechanism 71 is opened by the energization of shutter solenoid 278 the window 143 is again closed, and the bridge 165 is again lowered to the vertical position upon closure of switch 398 by cam No. 2. Thus, film plates may be moved into the viewing chamber 28 and withdrawn from the chamber 28 with no loss of vacuum within the microscope. In addition, the film mechanism may be operated from the control console 14 at a position remote from the position of the microscope column 10.

Although the invention has been shown in connection with preferred embodiments, it will be readily apparent to those skilled in the art that various changes in form and arrangement of parts may be made to suit requirements without departing from the spirit and scope of the invention as defined by the appended claims.

Having now described by invention, I claim:

1. In an electron microscope having a microscope chamber with a source of electrons positioned therein for directing electrons along a path through the chamber, and means for positioning an object in the electron beam so that at least some of the electrons pass through the object, the improvement of a film mechanism for positioning an electron stimulated means relative to the electron beam, comprising:
   a. a first storage means for unused electron stimulated means;
   b. a second storage means for used electron stimulated means;
   c. a wall between said first and second storage means and the electron beam path;
   d. a passage extending through said wall;
   e. closure means positioned across said passage;
   f. coiled extensible feeding means for feeding an unused electron stimulated means from said first storage means through said passage to an operative position within the microscope chamber, and for withdrawing said electron stimulated means through said passage and into said second storage means after said electron stimulated means has been exposed; and,
   g. drive means for reeling said coiled extensible feeding means into and out of its coiled configuration so as to extend said feeding means into and withdraw said feeding means from the microscope chamber.

2. The electron microscope of claim 1 wherein said coiled feeding means comprises a metallic tape rolled around a drum for storage and support, and said drive means is operable to reel said tape onto and off of said drum.

3. The electron microscope of claim 2 wherein said drive means comprises roller means drivingly engaging said tape, and motor means connected to said roller means for rotating said roller means in one direction to extend said tape into the microscope chamber, and for rotating said roller means in the opposite direction to withdraw said tape from the microscope chamber.

4. The electron microscope of claim 3 wherein said tape comprises a steel tape which is curved laterally to enhance its rigidity.

5. The electron microscope of claim 2 wherein:
   a. said closure means is adapted to open permitting extension of said tape through said passage and to close upon withdrawal of said tape from the microscope chamber;
   b. said closure means and said wall are formed of a material substantially opaque to penetrating radiation;
   c. said tape is adapted to disengage said electron stimulated means and withdraw through said passage once said electron stimulated means is positioned in the microscope chamber for exposure, and to re-extend through said passage and re-engage said electron stimulated means after exposure to withdraw said electron stimulated means from the microscope chamber;
   d. whereby said radiation opaque wall and closure means serve to shield other electron stimulated means positioned in said first and second storage means from radiation within the microscope chamber.

6. The electron microscope of claim 5 wherein said tape comprises a steel tape which is curved laterally to enhance its rigidity.

7. The electron microscope of claim 6 wherein said drive means comprises roller means drivingly engaging said tape, and motor means connected to said roller means for rotating said roller means in one direction to extend said tape into the microscope chamber, and for rotating said roller means in the opposite direction to withdraw said tape from the microscope chamber.

8. The electron microscope of claim 5 additionally including means for interrupting the electron beam at a time when said closure means is open, comprising:
   a. shutter means movable into and out of a position blocking the electron beam;
   b. control means operable for closing said shutter means so as to block the electron beam substantially concurrently with the opening of said closure means, and for opening said shutter means substantially concurrently with the closing of said closure means.

9. The electron microscope of claim 8 wherein said shutter means comprises a rotatably mounted shutter disc rotatable between positions in which one of a plurality of apertures in the disc are aligned with the electron beam and positions in which the disc blocks the beam.

10. In an electron microscope having a microscope chamber with a source of electrons positioned therein for directing electrons along a path through the chamber, and means for positioning an object in the electron beam so that at least some of the electrons pass through the object, the improvement of a film mechanism for positioning an electron stimulated means relative to the electron beam, comprising:
    a. a first storage means for unused electron stimulated means;
    b. a second storage means for used electron stimulated means;
    c. said first and second storage means comprising separate side-by-side regions of a single storage structure;
    d. a substantially radiation opaque wall between said storage structure and the electron beam path;
    e. a passage extending through said wall in communication with portions of both of said side-by-side regions;
    f. closure means positioned across said passage for normally closing said passage, said closure means being substantially opaque to radiation;
    g. feeding means comprising an actuating member for pushing an unused electron stimulated means from said first storage means through said passage to an operative position within the microscope chamber, and for withdrawing said electron stimulated means through said passage and into said second storage means after said electron stimulated means has been exposed;
    h. said actuating member comprising a metallic tape which is rolled around a drum for storage and support; and,
    i. drive means for reeling said tape onto and off of said drum so as to extend said tape into and withdraw said tape from the microscope chamber.

11. The electron microscope of claim 10 additionally including vacuum seal means interposed between said closure means and said wall such that the vacuum evacuated environment of the microscope chamber may be preserved during the loading of unused electron stimulated means into said storage structure and the unloading of used electron stimulated means from said storage structure.

12. The electron microscope of claim 10 additionally including tray means disposed within the microscope chamber and communicating with said passage for receiving and supporting an electron stimulated means inserted through said passage, said tray means being positioned to support said electron stimulated means so that said electron stimulated means will intercept electrons passing through the object.

13. The electron microscope of claim 12 wherein said tray means is adapted to receive unused electron stimulated means inserted into the microscope chamber from said first storage means, and to guide used electron stimulated means through said passage and into said second storage means.

14. The electron microscope of claim 10 wherein said drive means comprises roller means drivingly engaging said tape, and motor means connected to said roller means for rotating said roller means in one direction to extend said tape into the microscope chamber, and for rotating said roller means in the opposite direction to withdraw said tape from the microscope chamber.

15. The electron microscope of claim 14 wherein said tape comprises a steel tape which is curved laterally to enhance its rigidity.

* * * * *